United States Patent
Datta et al.

(10) Patent No.: US 11,494,804 B1
(45) Date of Patent: Nov. 8, 2022

(54) SYSTEMS AND METHODS FOR DETERMINING A DIVERSITY PENALTY IN CONNECTION WITH SELECTING ADVERTISEMENT CONTENT

(71) Applicant: Pinterest, Inc., San Francisco, CA (US)

(72) Inventors: Ashim Datta, San Francisco, CA (US); Dz-Mou Jung, San Mateo, CA (US); Kevin McLaughlin, San Francisco, CA (US); Javier Llaca Ojinaga, San Francisco, CA (US); Jiajing Xu, Palo Alto, CA (US)

(73) Assignee: Pinterest, Inc., San Francisco, CA (US)

( * ) Notice: Subject to any disclaimer, the term of this patent is extended or adjusted under 35 U.S.C. 154(b) by 300 days.

(21) Appl. No.: 16/681,243

(22) Filed: Nov. 12, 2019

(51) Int. Cl.
*G06Q 30/02* (2012.01)
*G06F 17/18* (2006.01)

(52) U.S. Cl.
CPC ......... *G06Q 30/0254* (2013.01); *G06F 17/18* (2013.01)

(58) Field of Classification Search
CPC ............................ G06Q 30/0254; G06F 17/18
USPC ....................................................... 705/14.52
See application file for complete search history.

(56) References Cited

U.S. PATENT DOCUMENTS

| | | | | |
|---|---|---|---|---|
| 2007/0027674 A1* | 2/2007 | Parson | ................... | G06F 40/211 704/9 |
| 2007/0203891 A1* | 8/2007 | Solaro | ................... | G06F 16/951 |
| 2008/0249832 A1* | 10/2008 | Richardson | ............ | G06Q 30/02 705/14.54 |
| 2011/0307323 A1* | 12/2011 | Kuhn | ................... | G06Q 30/0267 705/14.42 |
| 2011/0314495 A1* | 12/2011 | Zenor | ............... | H04N 21/25883 725/34 |
| 2015/0088635 A1* | 3/2015 | Maycotte | ........... | G06Q 30/0244 705/14.43 |

OTHER PUBLICATIONS

Kesavan, H.K., Kapur, J.N., The Generalized Maximum Entropy Principle, IEEE Transactions on Systems, Man, and Cybernetics, vol. 19, No. 5, Sep./Oct. 1989, downloaded from https://ieeexplore.ieee.org/stamp/stamp.jsp?arnumber=44019 (Year: 1989).*

Kapur, J.N., Kesavan, H.K., Entropy Optimization Principles and Their Application, Entropy and Energy Dissipation in Water Resources, pp. 3-20, 1992, downloaded from https://link.springer.com/content/pdf/10.1007/978-94-011-2430-0_1.pdf (Year: 1992).*

Thomas, Marlin U., A Generalized Maximum Entropy Principle, Operations Research, vol. 27, No. 6, Nov.-Dec. 1979, downloaded from https://www.jstor.org/stable/pdf/172093.pdf?refreqid=excelsior%3Aebb2a824c1e0c78901ca936f4fa0b7c7 (Year: 1979).*

(Continued)

*Primary Examiner* — Scott D Gartland
(74) *Attorney, Agent, or Firm* — Athorus, PLLC (57) ABSTRACT

Described are systems and methods for determining a diversity function in connection with potential advertisements in determining one or more advertisements to present to a user. This can facilitate presenting diverse advertisements to users. The diversity function can yield a diversity penalty for each potential advertisement to be able to determine a rank order of the potential advertisements. The diversity function can include a repetition score and a multiplier for each potential advertisement.

18 Claims, 9 Drawing Sheets

(56) References Cited

OTHER PUBLICATIONS

Shannon, C.E., A Mathematical Theory of Communication, The Bell System Technical Journal, vol. XXVII, No. 3, Jul. 1948 (Year: 1948).*
Entropy definition from The Free Dictionary, downloaded Jul. 1, 2022 from https://www.thefreedictionary.com/entropy, (Year: 2022).*
Entropy, definition from Merriam-Webster, downloaded Jul. 1, 2022 from https://www.merriam-webster.com/dictionary/entropy (Year: 2022).*

\* cited by examiner

SYSTEMS AND METHODS FOR DETERMINING A DIVERSITY PENALTY IN CONNECTION WITH SELECTING ADVERTISEMENT CONTENT

BACKGROUND

Advertisements are encountered nearly everywhere in online content. Advertisements are common on nearly all webpages, mobile applications, social media platforms, etc. Because of the ubiquitous nature of online advertisements, the efficacy of advertisements can be decreased. This can be especially true if the same ad (or an ad from the same advertiser) is repeatedly displayed to the same user. Repeatedly encountering the same ad can result in user disengagement, annoyance, avoiding certain platforms, etc. Further, merely placing absolute frequency limits to curb the number of times an advertisement may be displayed to a user can ignore other considerations in determining whether an advertisement should be displayed to a particular user.

DETAILED DESCRIPTION

As is set forth in greater detail below, embodiments of the present disclosure are directed to systems and methods for determining a diversity function for potential advertisements in determining one or more advertisements to present to a user. In determining advertisements to present to a user, a utility function may be utilized, which can determine and assign a value and/or ranking to potential advertisements based on various functions (e.g., a relevance factor, a bid factor, a landing page quality factor, etc.). According to certain embodiments, the diversity function, which can yield a diversity penalty for potential advertisements, may be incorporated into a broader utility function in determining which advertisement(s) to present to the user. The diversity function can include a repetition score for each potential advertisement, to which a multiplier can be applied. This can facilitate presenting diverse advertisements to users to mitigate user disengagement. According to the diversity function, the diversity of ads presented can be varied, for example, on an advertiser level, on a content level, or any other diversity criteria. According to embodiments of the present disclosure, the repetition score and the multiplier can be determined from advertisement impressions experienced by a user over a given lookback period. These advertisement impressions can be utilized to generate the repetition score and the multiplier, to determine a diversity penalty for each potential advertisement that may be presented to the user. The diversity penalty for each potential advertisement can then be utilized to determine which advertisement(s) to present to the user.

According to one embodiment, advertisement impressions over a lookback period can first be determined. Based on the determined advertisement impressions over the lookback period, a repetition score and a multiplier can be determined for each potential advertisement, and the diversity function can include a repetition score multiplied by the multiplier to obtain the diversity penalty. According to certain embodiments, the repetition score can include a comparison of a diversity index for a hypothetical benchmark advertisement to a diversity index for each potential advertisement. The hypothetical benchmark advertisement can include an advertisement that has never been presented to the user such that it would yield, from a diversity perspective, the highest possible diversity index. According to certain aspects, the diversity index for the hypothetical benchmark advertisement and each potential advertisement can include a quantification of the entropy associated with the hypothetical benchmark advertisement and each potential advertisement, respectively. The diversity index for each potential advertisement can then be compared to the diversity index corresponding to the hypothetical benchmark advertisement to obtain the repetition score for each potential advertisement. For example, the comparison can be a difference between the diversity index for the hypothetical benchmark advertisement and the diversity index for each potential advertisement. In this instance, the repetition score can then include an indication of a difference in the entropies (e.g., a delta entropy) for the hypothetical benchmark advertisement and each potential advertisement. Consequently, the minimum value of the diversity function, when represented as a diversity penalty, where the repetition score includes a difference between the diversity index for the hypothetical benchmark advertisement and the diversity index for each potential advertisement may be zero. This comparison (i.e., the repetition score) can then be utilized to generate a diversity penalty associated with each potential advertisement through application of a multiplier. For example, the multiplier can be based on the advertisements presented (e.g., frequency, number, content, etc.) to the user over the lookback period. According to certain embodiments, the multiplier can be a constant multiplier, a normalizing multiplier, etc.

According to certain embodiments, in determining the diversity indices, each advertisement impression experienced by the user over the lookback period can be provided with different weights. For example, weights of the advertisements experienced by the user during the lookback period may be subject to a time decay function such that older advertisements experienced by the user during the lookback period may be given a lower weight when compared to more recent advertisements experienced by the user.

The diversity function can be utilized to generate a ranking of the potential advertisements to next present to the user. For example, in embodiments where the diversity function yields a diversity penalty, the potential advertisement with the lowest diversity penalty can be given the highest rank, and the potential advertisement with the highest diversity penalty can be given the lowest rank. This ranking can then be utilized to determine that next advertisement, from the potential advertisements, to present to the user.

According to other embodiments of the present disclosure, the diversity function can be incorporated into a utility function to determine which advertisement to present to the user. For example, the diversity function can be one factor of many (e.g., a relevance factor, a bid factor, a landing page quality factor, etc.) that can be utilized by a utility function to determine a ranking order of the potential advertisements. The ranking order of the advertisements can dictate which advertisement is next presented to the user. The utility function can also include a trimmer function which can eliminate certain advertisements from the potential advertisements. For example, the trimmer can act as a filter to eliminate potential advertisements that rank below a certain threshold from consideration. The threshold can be determined on how a rank order may be affected by the various factors included in the utility function, including a diversity function. For example, if, after application of a diversity function for each potential advertisement, there is no possibility of the respective advertisement being chosen as the next advertisement to be presented to the user (e.g., even with the lowest possible diversity penalty), the advertisement may be eliminated from consideration by the trimmer. The ranking of potential advertisements determined by the utility function, including consideration of the diversity function for each advertisement, can then be utilized to determine which advertisement to next present to the user.

Figure 1:
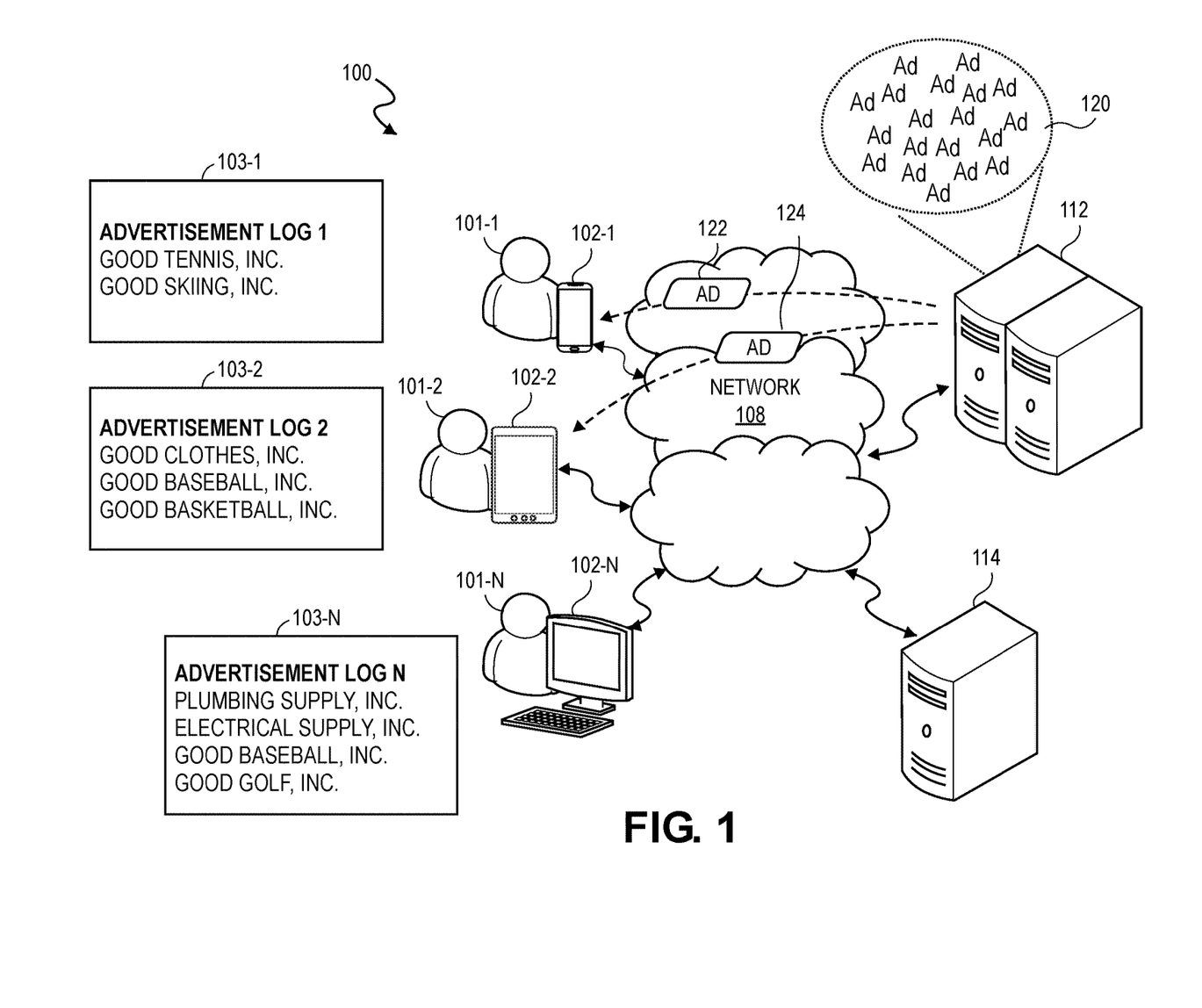
FIG. 1 is block diagram illustrating an exemplary network environment for implementing embodiments of the present disclosure.

FIG. 1 shows an exemplary system 100 according to embodiments of the present disclosure. As shown in FIG. 1, users 101-1, 101-2, and 101-N can, via client devices 102-1, 102-2, and 102-N, respectively, access content via network 108. For example, each of users 101-1, 101-2, and 101-N can interact with content system 112 or 114 via network 108 and applications executed on client devices 102-1, 102-2, and 102-N, respectively. Content system 112 can include one or more advertisements 120 that may be provided for presentation to users 101-1, 101-2, and 101-N on client devices 102-1, 102-2, and 102-N, respectively. Client devices 102-1, 102-2, and 102-N can be any type of computing device, such as a smartphone, tablet, laptop computer, desktop computer, wearable, etc. As shown in FIG. 1, as users interact with content systems 112 and 114, users 101-1, 101-2, and 101-N may be presented advertisements 122 and 124. Advertisements 122 and 124 may be presented by content system 112 via network 108 for presentation on client devices 102-1, 102-2, and 102-N. As users 101-1, 101-2, and 101-N are presented advertisements, a log of advertisements presented to each user may be recorded in advertisement logs 103-1, 103-2, and 103-N. The log of advertisements may include, for example, the advertiser, a type of advertisement, the product being advertised, etc. Advertisement logs 103-1, 103-2, and 103-N for each user may be recorded on one device, or across multiple devices.

Further, advertisement logs may be recorded over a predetermined time period (e.g., 30 minutes, 1 hour, 2 hours, 6 hours, 12 hours, 24 hours, 2 days, 1 week, etc.), with the oldest advertisements being written over as new advertisements are recorded. Alternatively, a continuous log of all advertisements presented to the user may be recorded. The advertisements recorded in advertisement logs 103-1, 103-2, and 103-N may include advertisements presented to users 101-1, 101-2, and 101-N, respectively, in one session or across multiple sessions over a period of time. Based on the recorded advertisements in advertisement logs 103-1, 103-2, and 103-N, a diversity penalty can be determined for each potential advertisement in connection with each of users 101-1, 101-2, and 101-N. The diversity penalty can be utilized by a utility function to facilitate presenting users 101-1, 101-2, and 101-N with diverse advertisements.

Figure 2:
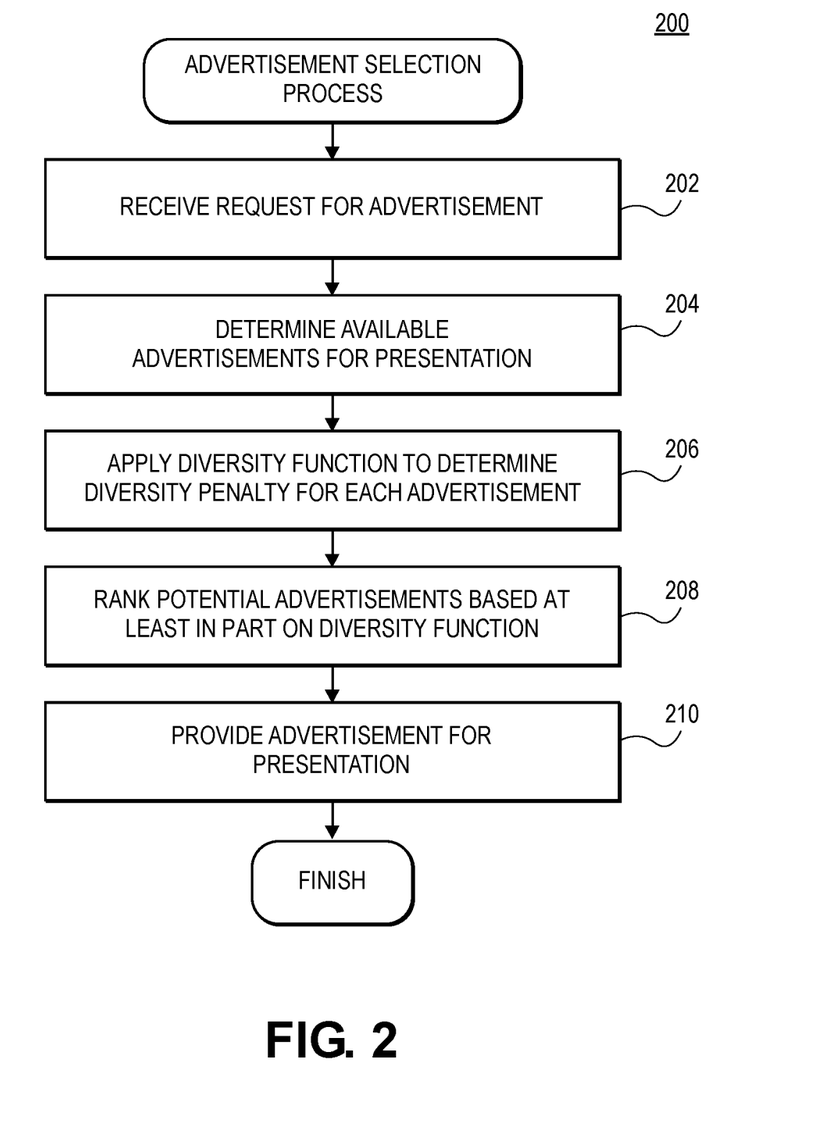
FIG. 2 is a flow diagram of an exemplary advertisement selection process in accordance with embodiments of the present disclosure.

FIG. 2 shows a flow diagram of an exemplary advertisement selection process 200 according to embodiments of the present disclosure. As shown in FIG. 2, process 200 can begin with step 202 upon receipt of a request for an advertisement to present to a user on a client device. For example, content system 112 can receive a request for an advertisement to present to users 101-1, 101-2, and/or 101-N on client devices 102-1, 102-2, and/or 102-N, respectively. After the request for an advertisement to present to a user has been received, the potential advertisements that can be presented to the user can be identified or determined in step 204. The potential advertisements can include, for example, all the possible advertisements 120 available to content system 112. Alternatively, the potential advertisements can include a filtered set of advertisements based on, for example, the user's profile, preferences, demographics, interests, interaction history with content system 112, etc. For example, the filtered set of advertisements that can make up the potential advertisements considered for presentation can be customized based on any criteria and/or function (e.g., advertisers, relevance, bid factor, etc.).

Next, a diversity function can be applied to determine a diversity penalty in step 206 for each potential advertisement. The diversity penalty for each potential advertisement can be based on the number and types of advertisement impressions the user has experienced over a given lookback period to facilitate presenting diverse advertisements to users. For example, the value of the diversity penalty can be large for an advertisement that may be considered repetitive in view of advertisements already experienced by the user during the lookback period when compared to the value of the diversity penalty for an advertisement that may be new to the user in view of the lookback period. The large diversity penalty can reduce the likelihood that the advertisement with the large diversity penalty is presented to the user. Conversely, the diversity penalty may be small for advertisements that may be considered new to the user in view of the lookback period when compared to the diversity penalty for advertisements that may be considered repetitive in view of the lookback period. Consequently, the small diversity penalty can increase the likelihood that the advertisement with the small diversity penalty may be presented to the user.

Figure 3:
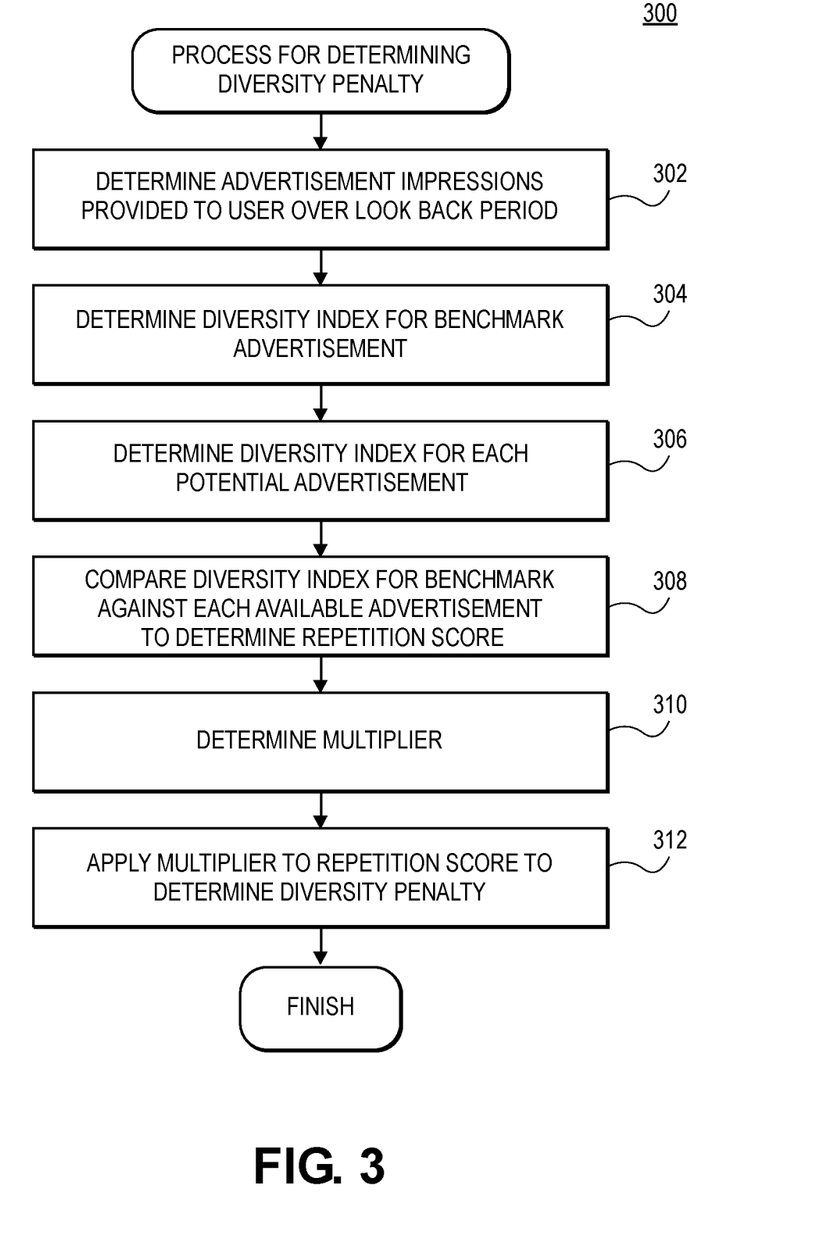
FIG. 3 is a flow diagram of an exemplary process for determining a diversity penalty in accordance with embodiments of the present disclosure.

As described further herein and in connection with FIG. 3, determination of the diversity penalty can include determining a repetition score and a multiplier. The repetition score can include determining a diversity index for each potential advertisement and comparing the diversity index to a diversity index for a hypothetical benchmark advertisement. For example, the comparison of the diversity index of each potential advertisement to the diversity index for the hypothetical benchmark advertisement can be a difference of the two diversity indices. According to aspects of the present disclosure, the diversity indices can include an indication of the respective entropies, and the comparison of the diversity indices can include a difference in the entropies (i.e., a delta entropy). According to certain embodiments, a multiplier can be applied to the comparison to obtain the diversity penalty for each potential advertisement. For example, the multiplier can include a normalizing multiplier to provide a normalized delta entropy as the diversity penalty. According to certain embodiments, the diversity function utilized to obtain the diversity penalty for a potential advertisement can be represented as:

$$\text{diversity utility}(ad) = \alpha * \text{repetition\_score}(ad) \quad (1)$$

where ad can include the potential advertisement being considered, α can represent a multiplier, and repetition_score (ad) can represent a repetition score associated with the potential advertisement.

According to certain embodiments, the diversity function can be based on an advertiser (e.g., to facilitate that advertisements from the same advertiser are not repeatedly shown to the user), the type of advertisement (e.g., to facilitate that advertisements for the same type of products are not repeatedly shown to the user), other diversity criteria, or any combination thereof.

Based on the diversity penalties for each potential advertisement, the potential advertisements can be ranked in step 208 based at least in part on the diversity penalties for each potential advertisement. For example, the potential advertisement with the lowest diversity penalty can be provided the highest ranking and the potential advertisement with the greatest diversity penalty can be provided the lowest ranking. According to certain embodiments, the diversity penalty can be utilized in a utility function to rank the potential advertisements. The utility function can include other factors, such as a relevance factor, a bid factor, a landing page quality factor, etc., in addition to the diversity penalty, and the advertisement with the greatest utility score from the utility function can be provided the highest rank and the advertisement with the lowest utility score from the utility function can be provided the lowest rank.

Based on the rankings determined in step 208, the one or more advertisements to be presented to the user can be determined and provided for presentation to the user in step 210. For example, if at step 202 five advertisements were requested for presentation to the user, the top five ranked potential advertisements can be provided to the user for presentation. Alternatively, if only one advertisement was requested, the top ranked advertisement can be provided for presentation to the user. Accordingly, any number of requested advertisements can be provided for presentation to the user. According to embodiments of the present disclosure, the advertisements to be provided for presentation to the user can be provided by content system 112, which can provide the selected advertisement(s) for presentation to users 101-1, 101-2, and/or 101-N via network 108 to client devices 102-1, 102-2, and/or 102-N, respectively.

FIG. 3 illustrates a flow diagram of an exemplary process 300 of determining a diversity penalty according to embodiments of the present disclosure. In step 302, advertisement impressions experienced by a user over a given lookback period can be determined. Alternatively, step 302 can determine the advertisements provided for presentation on the client device but were not necessarily experienced by the user. For example, content system 112 may have sent the advertisements to any of client device 102-1, 102-2, and/or 102-N, however, for any given reason, the advertisement may not have actually been presented to any of user 101-1, 101-2, and/or 101-N. The advertisement may be held in the cache (or other memory component) of client device 102-1, 102-2, and/or 102-N. Accordingly, embodiments of the present disclosure may be able to determine advertisements that were sent for presentation (regardless of whether the advertisement was actually displayed), as well as advertisements that were actually sent and displayed for consumption by the user. Furthermore, aspects of the present disclosure may be able to distinguish (and track) advertisements that were actually sent and presented from advertisement that were only sent for presentation but were not actually displayed on the client device.

The lookback period can be any period of time that may be relevant in considering the diversity of advertisements to present to the user. For example, the lookback period can be 30 min, 1 hour, 2 hours, 3 hours, 4 hours, 12 hours, 24 hours, 2 days, etc. According to exemplary embodiments, the advertisement impressions over the lookback period can be determined from advertisement logs 103-1, 103-2, and 103-N. For example, the advertisements can be a subset of the advertisements recorded in advertisement logs 103-1, 103-2, and 103-N. Alternatively, advertisement logs 103-1, 103-2, and 103-N can keep a rolling record of the advertisements presented to users 101-1, 101-2, and/or 101-N over the specified lookback period.

Figure 10:
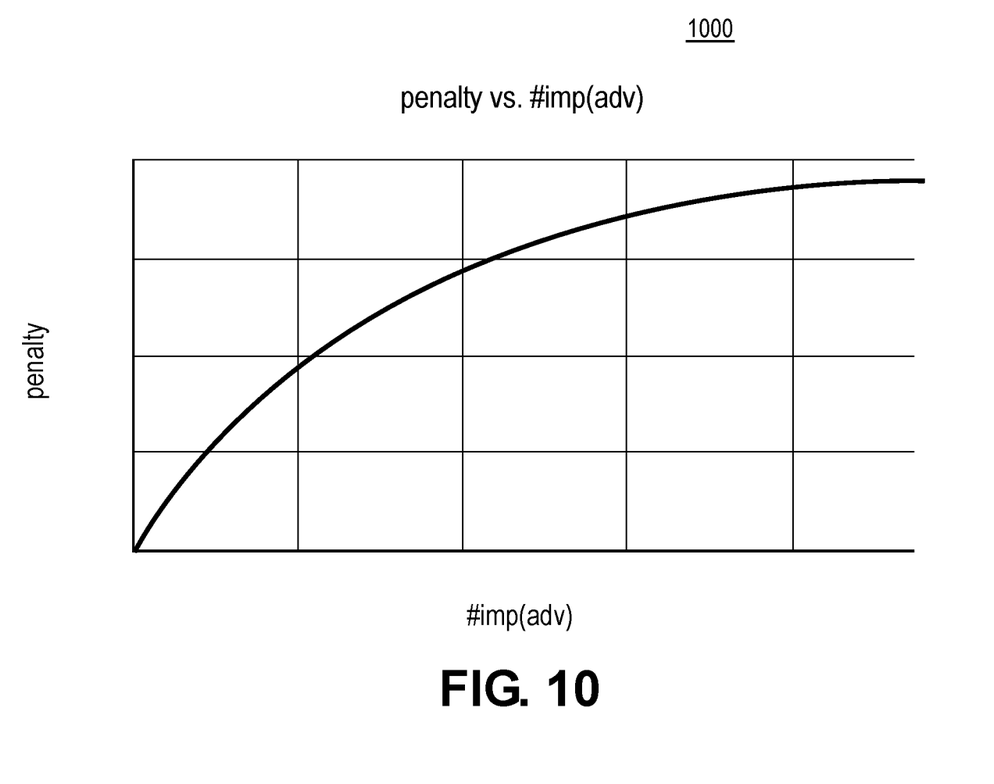
FIG. 10 shows a graphical representation of a diversity penalty as a function of a total number of previous advertisement impressions over a lookback period, according to aspects of the present disclosure.

After the advertisement impressions over the lookback period have been determined, a repetition score can be determined for each potential advertisement. According to certain embodiments, the repetition score for a potential advertisement can be the ratio of the number of advertisement impressions experienced by a given advertiser to the number of advertisement impressions over the lookback period plus one. This repetition score can be represented as follows:

$$\text{repetition\_score}(ad) = \frac{\#imp(adv)}{\#pre\_imp + 1} \quad (2)$$

where ad can represent the potential advertisement being considered, #imp(adv) is the number of advertisement impressions experienced by the user from the advertiser associated with the potential advertisement ad during the lookback period, and #pre_imp is the total number of advertisement impressions experienced by the user during the lookback period. FIG. 10 shows a graphical representation 1000 of an exemplary diversity penalty as a function of the total number of previous advertisement impressions over the lookback period when the above repetition score of representation (2) is utilized to determine the diversity penalty.

According to other embodiments, the repetition score can be determined by first determining a diversity index for a hypothetical benchmark advertisement (step 304) and a diversity index for each potential advertisement (step 306). After the diversity indices have been determined, as shown in step 308, the repetition score can be determined by comparing the diversity indices determined in steps 304 and 306. For example, the repetition score can include a difference between the diversity index for a hypothetical benchmark advertisement (step 304) and a diversity index for each potential advertisement (step 306).

According to certain embodiments, the diversity index can include a quantification of the entropy associated with the candidate advertisement (i.e., the hypothetical advertisement or each potential advertisement). Accordingly, the diversity index including a quantification of entropy can be generalized as:

$$\text{entropy}(ad) = \text{entropy after showing candidate } ad \quad (3)$$

where ad can include the candidate advertisement being considered (i.e., the hypothetical advertisement or each potential advertisement). According to certain embodiments, the quantification of the entropy associated with a candidate advertisement can include a Shannon Index associated with the candidate advertisement being considered. The Shannon Index for a candidate advertisement can be represented as:

$$\text{entrophy } (ad_j) = -\sum_{i}^{IU\{j\}} P_i \log P_i \quad (4)$$

where IU{j} can represent a set of all advertisers which have been impressed to the given user prior to this request for an advertisement plus the advertiser associated with the candidate $ad_j$ and $P_i$ can represent the percentage of advertisement impressions from the advertiser i.

In connection with determining the diversity index for the hypothetical benchmark advertisement, the hypothetical benchmark advertisement can include an advertisement that presents a best-case scenario advertisement (from a diversity perspective) in view of the advertisement impressions experienced by the user during the lookback period. According to embodiments where the diversity index includes a quantification of entropies, the diversity index for the hypothetical benchmark advertisement can include a maximum possible entropy, which may be associated with an advertisement that has never been presented to/experienced by the user. Accordingly, the repetition score in this instance can be represented as:

$$\text{repetition\_score}(ad) = \text{max\_possible\_entropy} - \text{entropy} (ad) \quad (5)$$

where ad can represent the potential advertisement being considered and max_possible_entropy can include the entropy of the hypothetical benchmark advertisement. The hypothetical benchmark advertisement can be based on any desired diversity criteria. For example, the hypothetical benchmark advertisement can be based on the advertiser such that the hypothetical benchmark advertisement includes an advertisement from an advertiser that the user did not experience during the lookback period. In this regard, if the user had experienced advertisements from GOOD TENNIS, INC., GOOD BASEBALL, INC., and GOOD BASKETBALL, INC. during the lookback period, a hypothetical benchmark advertisement may include any hypothetical advertisement that is not from any of GOOD TENNIS, INC., GOOD BASEBALL, INC., and GOOD BASKETBALL, INC. Alternatively, the hypothetical benchmark advertisement can be based on the type of advertisement such that the hypothetical benchmark advertisement includes an advertisement for a type of product not experienced by the user during the lookback period. In this regard, if the user had experienced advertisements in connection with plumbing materials, power tools, and electrical supply during the lookback period, the hypothetical benchmark advertisement may include any advertisement that is not related to plumbing materials, power tools, or electrical supply. The hypothetical benchmark advertisement may also be based on other diversity criteria, or any combination thereof.

Figure 8:
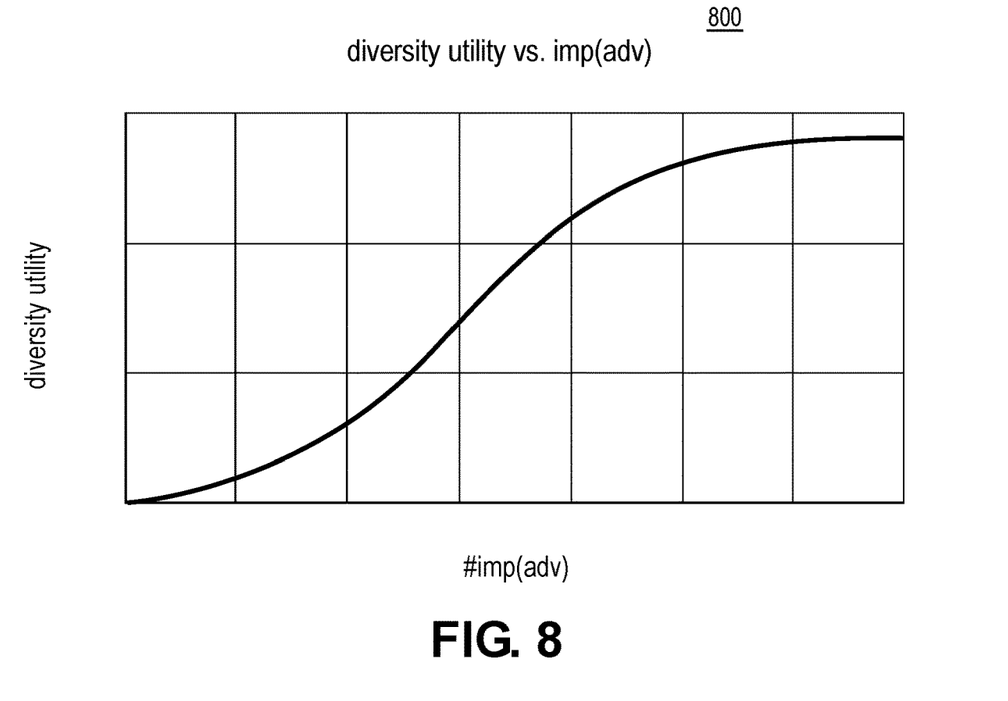
FIG. 8 shows a graphical representation of a diversity utility as a function of a total number of previous advertisement impressions over a lookback period, according to aspects of the present disclosure.

In step 310, the multiplier to be applied to the repetition score can be determined. Aspects of determining a multiplier are also discussed in connection with FIG. 4 herein. According to an embodiment of the present disclosure, the multiplier can be set as a constant depending on an overall utility function that may be utilized with the diversity penalty. For example, if a given utility function has a maximum value of $U_{max}$, the multiplier can be established at $U_{max}$ so that the diversity penalty can effectively negate the maximum value of the utility function if the number of repetitive advertisement impressions exceeds a predetermined threshold. For example, if the maximum possible value of the utility function in which the diversity function will be included is $U_{max}$ and the maximum possible value of the repetition score is $RP_{max}$, the multiplier can be established to be $U_{max}/RP_{max}$ if it is desired that the diversity function could effectively negate the maximum value of utility function as a whole. Alternatively, the multiplier can be established to effectively negate the maximum value of one or more factors of the utility function in which the diversity function will be included. For example, if it is desired that the diversity function can effectively negate the maximum value of a relevance factor of a utility function and the maximum possible value of the relevance factor is $R_{max}$ and the maximum possible value of the repetition score is $RP_{max}$, the multiplier can be established to be $R_{max}/RP_{max}$. Alternatively, the multiplier can be established at any constant to effectively negate the maximum value of one or more factors of the utility function (e.g., a relevance factor, a bid factor, a landing page quality factor, etc.) rather than the utility function as a whole. FIG. 8 shows a graphical representation 800 of an exemplary diversity utility as a function of the total number of previous advertisement impressions over the lookback period with a constant multiplier.

Figure 9:
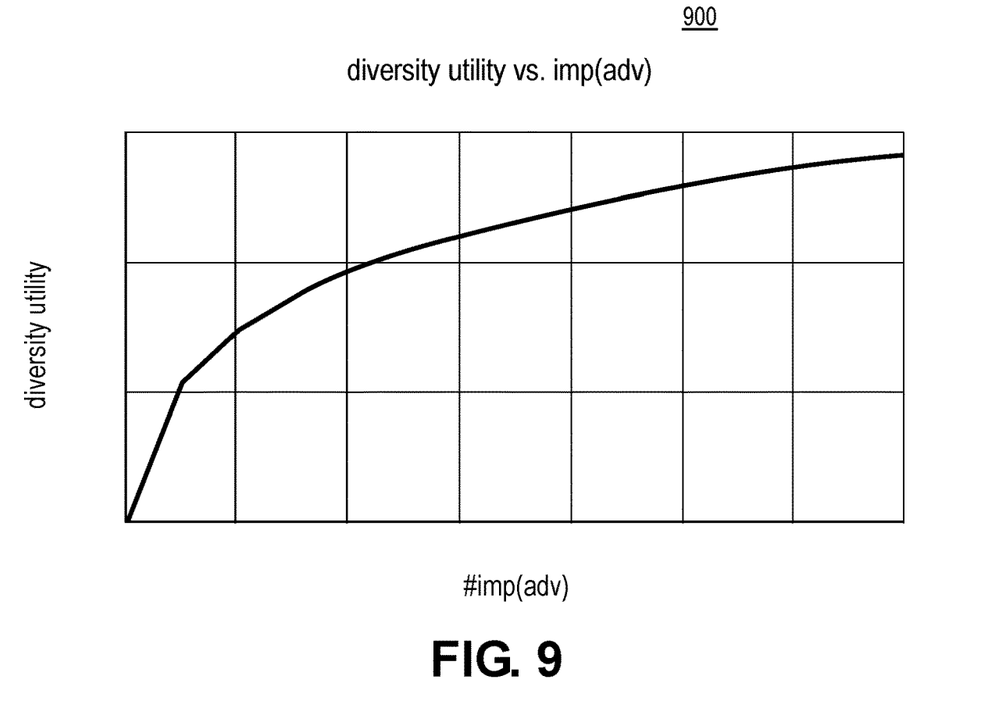
FIG. 9 shows another graphical representation of a diversity utility as a function of a total number of previous advertisement impressions over a lookback period, according to aspects of the present disclosure.

According to embodiments of the present disclosure, the multiplier can be directly proportional to a number of advertisement impressions experienced by a user over the lookback period. For example, the multiplier can be represented by:

$$k*(\#prev\_imp+1) \quad (7)$$

where #prev_imp can include the number of advertisement impressions experienced by the user during the lookback period and k can include a constant that can be determined based on the maximum diversity penalty that is desired. This can be referred to as the delta entropy multiplier. For example, the maximum diversity penalty can be based on the overall utility function into which the diversity penalty may be utilized. For example, the constant can be established such that the diversity penalty can effectively negate the maximum value of the utility function if the number of repetitive advertisement impressions exceeds a predetermined threshold. According to certain aspects, this threshold can be fifteen, twenty, twenty-five, thirty, thirty-five, forty, or any number of advertisement impressions. Alternatively, the constant can be established to effectively negate the maximum value of one or more factors of the utility function (e.g., a relevance factor, a bid factor, a landing page quality factor, etc.) rather than the utility function as a whole. FIG. 9 shows a graphical representation 900 of an exemplary diversity utility as a function of the total number of previous advertisement impressions over the lookback period with a multiplier in representation (7) is used.

According to embodiments of the present disclosure, the multiplier can include a normalizing factor to compensate for users that experience a high volume of advertisement impressions. The normalizing factor considers that a user who has experienced a large number of advertisement impressions during the lookback period may be more tolerant of repetitive advertisements, and the normalizing factor can normalize the repetition score to lessen the diversity penalty's impact in this instance. For example, the normalizing factor can, for example, normalize the repetition score (e.g., a delta entropy) if the number of advertisement impressions a user has experienced during the lookback period is above a predetermined threshold. For example, the multiplier can include a certain multiplier (e.g., the delta entropy multiplier) when the number of advertisement impressions is under a threshold value and can include a normalizing factor that is inversely proportional to the number of advertisement impressions when the number of advertisement impressions has exceeded the threshold. According to one aspect, the normalizing factor can be represented as:

$$\frac{k^4}{\#prev\_imp + 1} \quad (6)$$

for $\#prev\_imp \geq k_4$, where $k_4$ can include a median number of advertisement impressions shown to a single user and $\#prev\_imp$ can include the number of advertisement impressions experienced by the user during the lookback period.

After the multiplier has been determined, the multiplier can be applied to the repetition score to obtain the diversity penalty in step 312. As described herein, the diversity function to obtain the diversity penalty for each potential advertisement can be represented as:

$$\text{diversity utility}(ad) = \alpha * \text{repetition\_score}(ad) \quad (1)$$

where ad can include the potential advertisement being considered, a can represent a multiplier, and repetition_score (ad) can represent a repetition score associated with the potential advertisement. The representation of a can include any multiplier described herein, and repetition_score(ad) can represent any repetition score associated with the potential advertisement as described herein. According to one embodiment of the present disclosure, a can represent a normalizing multiplier and repetition_score(ad) can represent a delta entropy repetition score associated with the potential advertisement. For example, a can include:

$$k*(\#prev\_imp+1) \quad (7)$$

if $\#prev\_imp < k_4$ or:

$$k*k_4 \quad (8)$$

for $\#prev\_imp \geq k_4$, where $k_4$ can include a median number of advertisement impressions shown to a single user and $\#prev\_imp$ can include the number of advertisement impressions experienced by the user during the lookback period, and repetition_score(ad) can include:

$$\text{repetition\_score}(ad) = \text{max\_possible\_entropy} - \text{entropy}(ad) \quad (5)$$

where ad can represent the potential advertisement being considered and max_possible_entropy can include the entropy of the hypothetical benchmark advertisement. The entropy of the hypothetical benchmark advertisement and each potential advertisement can include a Shannon Index, which can be represented as:

$$\text{entrophy}(ad_j) = -\sum_i^{IU\{j\}} P_i \log P_i \quad (4)$$

where IU{j} can represent a set of all advertisers which have been impressed to the given user prior to this request for an advertisement plus the advertiser associated with the candidate $ad_j$ and $P_i$ can represent the percentage of advertisement impressions from the advertiser i associated with the candidate advertisement $ad_i$. According to certain embodiments, $k_4$ can be 5 advertisements, 10 advertisements, 15 advertisements, 20 advertisements, 25 advertisements, 30 advertisements, 35 advertisements, 40 advertisements, or any other number of advertisements.

Figure 4:
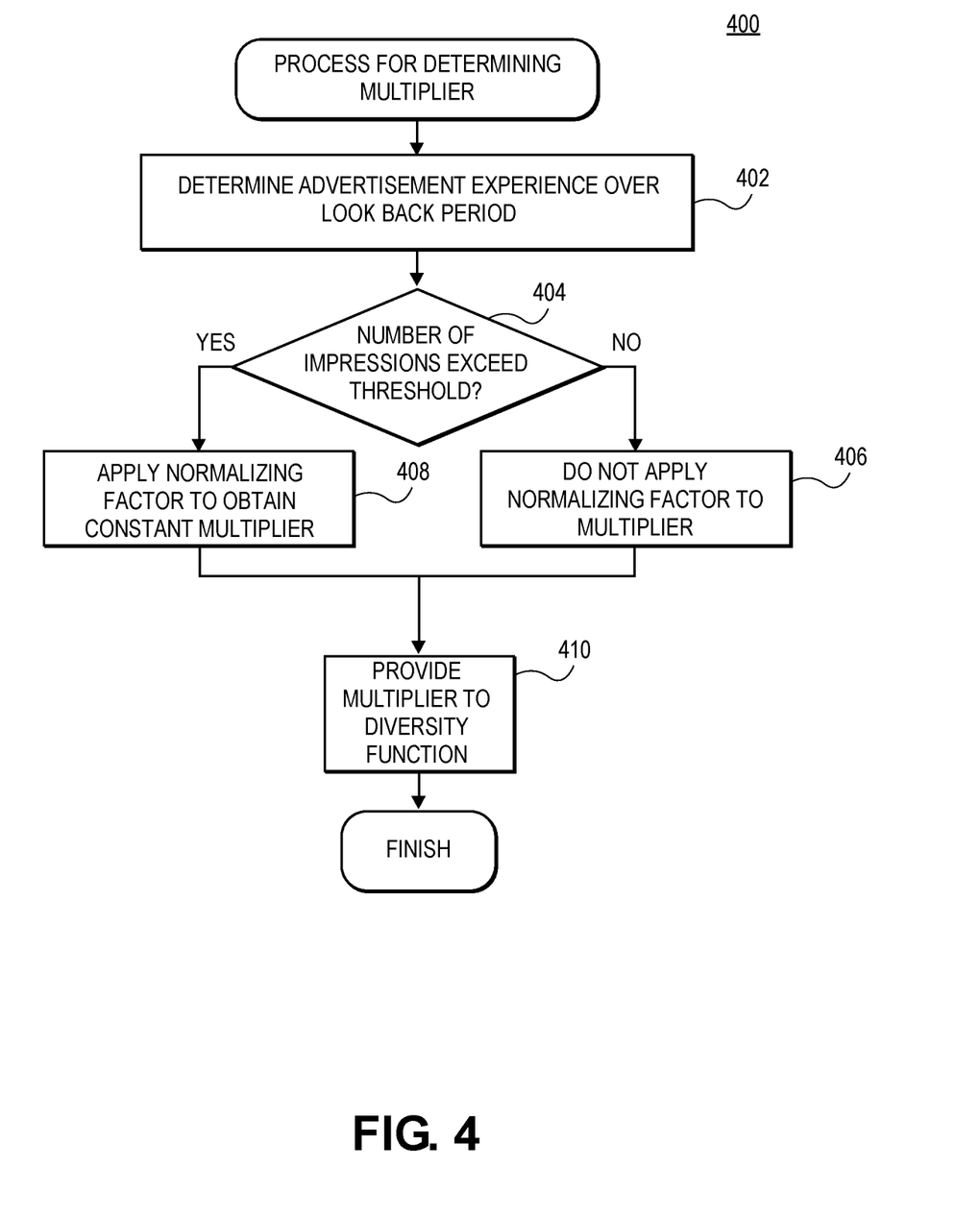
FIG. 4 is a flow diagram of an exemplary process for determining a multiplier in accordance with embodiments of the present disclosure.

FIG. 4 shows a flow diagram of an exemplary process 400 for determining a multiplier for a diversity function. In step 402, the overall advertisement experience for the user over the lookback period can be determined. For example, this can include the number of advertisement impressions experienced by the user, the type of advertisements experienced by the user, the advertisers experienced by the user, the number of advertisements presented by a given advertiser, the number of advertisements of a given type, etc., or any combination thereof. The advertisement experience for the user can also consider the time that has elapsed for each advertisement experienced by the user. Determining the overall advertisement experience for the user over the lookback period can allow different weights to be applied to each potential advertisement being considered for presentation to further customize the advertisement experience for the user. For example, a time decay weighting function can be included such that older advertisements have a lower impact on the diversity function and more recent advertisements have a higher impact on the diversity function. Alternatively, other weighting functions can be included to emphasize and/or deemphasize certain advertisements in the diversity function.

In step 404, it can be determined whether the number of advertisement impressions experienced by the user exceeds a threshold value. According to certain embodiments, the threshold value can include a median number of advertisement impressions experienced by all users. This value can be, for example, 10 advertisement impressions, 15 advertisement impressions, 20 advertisement impressions, 25 advertisement impressions, 30 advertisement impressions, 35 advertisement impressions, 40 advertisement impressions, or any number of advertisement impressions. If the number of advertisement impressions exceeds the threshold value, the multiplier can include a normalizing factor (step 406), such as the normalizing factor shown in equation (6), to obtain a multiplier that is a constant, such as the multiplier shown in equation (8). If the number of advertisement impression has not exceeded the threshold value, in step 408, no additional normalizing factor is applied to the multiplier. In step 410, the multiplier can be provided to the diversity function.

Figure 5:
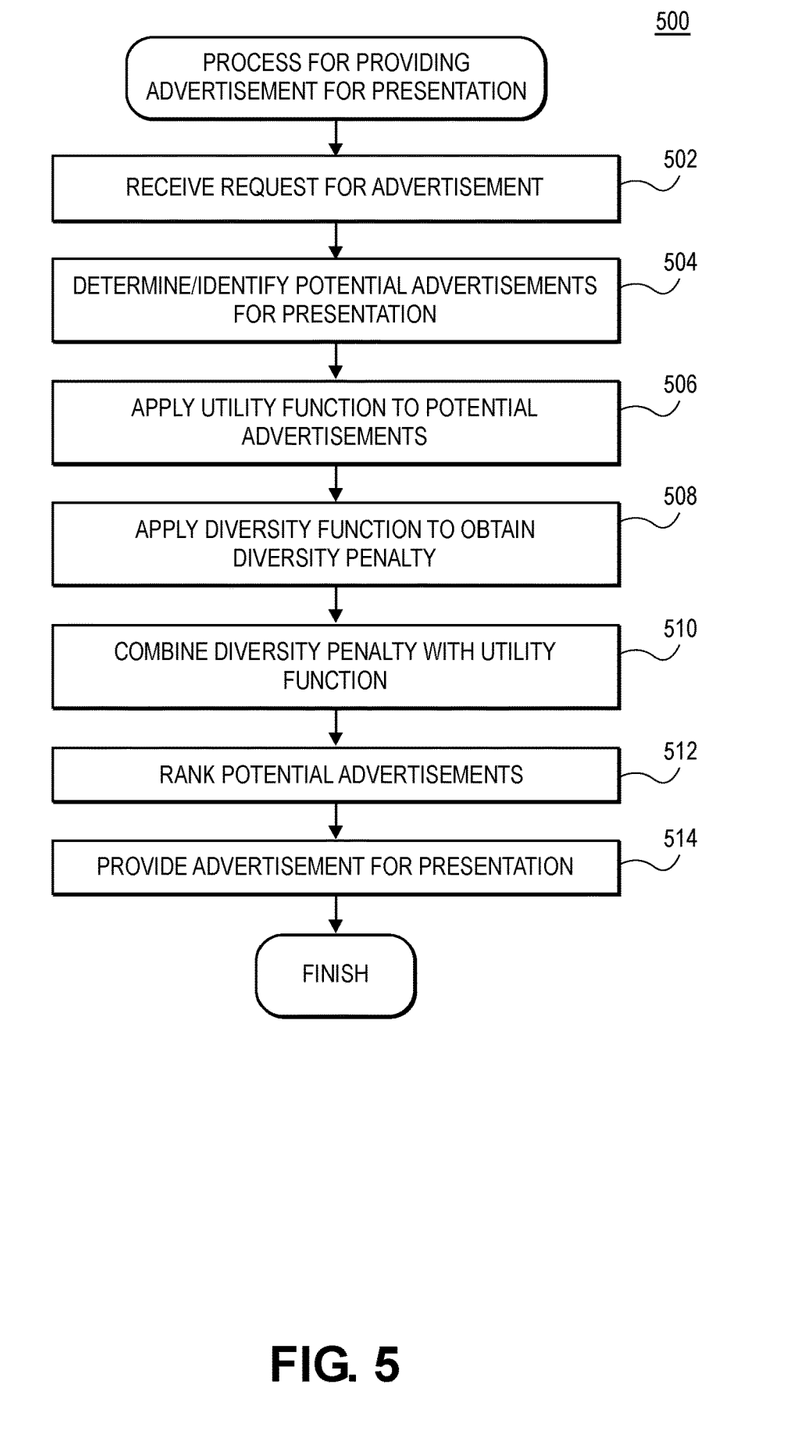
FIG. 5 is a flow diagram of an exemplary advertisement selection process in accordance with embodiments of the present disclosure.

FIG. 5 shows a flow diagram of an exemplary process 500 for providing an advertisement for presentation utilizing a utility function that incorporates a diversity function. In step 502, a request for one or more advertisements may be received. In step 504, the potential advertisements that may be provided for presentation may be identified or determined. For example, the potential advertisements can be identified or determined by content system 112 and can include one or more of advertisements 120. In step 506, a utility function to be utilized can be determined and applied to the potential advertisements. According to certain embodiments, the utility function can apply certain factors (e.g., a relevance factor, a bid factor, a landing page quality factor, etc.) to generate a ranking of one or more of the potential advertisements that may be generated. In step 508, a diversity function can be applied to each potential advertisement to determine a diversity penalty for each potential advertisement. As described herein, the diversity function to obtain the diversity penalty for each potential advertisement can be represented as:

$$\text{diversity\_utility}(ad) = \alpha * \text{repetition\_score}(ad) \quad (1)$$

where ad can include the potential advertisement being considered, a can represent a multiplier, and repetition_score (ad) can represent a repetition score associated with the potential advertisement. The representation of a can include any multiplier described herein, and repetition_score(ad) can represent any repetition score associated with the potential advertisement as described herein. According to one embodiment of the present disclosure, a can represent a normalizing multiplier and repetition_score(ad) can represent a delta entropy repetition score associated with the potential advertisement. For example, a can include:

$$k*(\#prev\_imp+1) \quad (7)$$

if #prev_imp<$k_4$ or:

$$k*k_4 \quad (8)$$

for #prev_imp≥$k_4$, where $k_4$ can include a median number of advertisement impressions shown to a single user and #prev_imp can include the number of advertisement impressions experienced by the user during the lookback period, and repetition_score(ad) can include:

$$\text{repetition\_score}(ad) = \text{max\_possible\_entropy} - \text{entropy}(ad) \quad (5)$$

where ad can represent the potential advertisement being considered and max_possible_entropy can include the entropy of a hypothetical benchmark advertisement. The entropy of the hypothetical benchmark advertisement and each potential advertisement can include a Shannon Index, which can be represented as:

$$\text{entrophy}(ad_j) = -\sum_i^{IU\{j\}} P_i \log P_i \quad (4)$$

where IU{j} can represent a set of all advertisers which have been impressed to the given user prior to this request for an advertisement plus the advertiser associated with the candidate $ad_j$ and $P_i$ can represent the percentage of advertisement impressions from the advertiser i associated with the candidate advertisement $ad_i$. After the diversity penalty has been determined, it can be combined with the original utility function in step 510, resulting in a revised utility function, which includes the diversity function. If the original utility function is represented as $U_{org}(ad)$, the revised utility function $U_{revised}(ad)$ can be represented as follows:

$$U_{revised}(ad) = U_{org}(ad) - \text{diversity\_utility}(ad) \quad (9)$$

As described herein, various components of the diversity utility function (e.g., the multiplier, the repetition score, etc.) can be adjusted such that the diversity utility can effectively negate the maximum value of original utility function $U_{org}$(ad), or one or more factors of the utility function (e.g., a relevance factor, a bid factor, a landing page quality factor, etc.) rather than the utility function as a whole.

Based on the combination of the utility function and the diversity penalties for each potential advertisement, the potential advertisements can be ranked in step 512. For example, the potential advertisement with the highest revised utility function value can be provided the highest ranking and the potential advertisement with the lowest revised utility function value can be provided the lowest ranking. Based on the rankings determined in step 512, the one or more advertisements to be presented to the user can be determined and provided for presentation to the user in step 514. For example, if at step 502 five advertisements were requested for presentation to the user, the top five ranked potential advertisements can be provided to the user for presentation. Alternatively, if only one advertisement was requested, the top ranked advertisement can be provided for presentation to the user. Accordingly, any number of requested advertisements can be provided for presentation to the user. According to embodiments of the present disclosure, the advertisements to be provided for presentation to the user can be provided by content system 112, which can provide the selected advertisement(s) for presentation to users 101-1, 101-2, and/or 101-N via network 108 to client devices 102-1, 102-2, and/or 102-N, respectively.

Optionally, it can be determined whether a trimmer or filter should be applied to the potential advertisements being considered for presentation. According to aspects of the present disclosure, a trimmer or filter can be applied at any point during process 500 to the potential advertisements being considered for presentation. For example, a trimmer or filter can be applied before step 504 in determining the potential advertisements to be considered for presentation. Alternatively, a trimmer or filter can be applied before or after application of the utility function in step 506 to reduce the advertisements under consideration. According to yet another aspect, a trimmer or filter can be applied after step 508 and/or 510 where the diversity function has been applied and/or combined with the utility function. As described herein, a trimmer or filter can incorporate any criteria and factors to eliminate certain advertisements based on the ranking and/or value that may have been assigned to each respective advertisement.

Regarding the processes 200, 300, 400, and 500 described above with respect to FIGS. 2 through 5, as well as other routines and/or processes described or suggested herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 7 below. Additionally, in various implementations, all or some of the various routines may also be embodied in executable hardware modules including, but not limited to, systems on chips (SoC's), codecs, specially designed processors and/or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated implementations. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure, computer readable media expressly excludes carrier waves and/or propagated signals.

Figure 6:
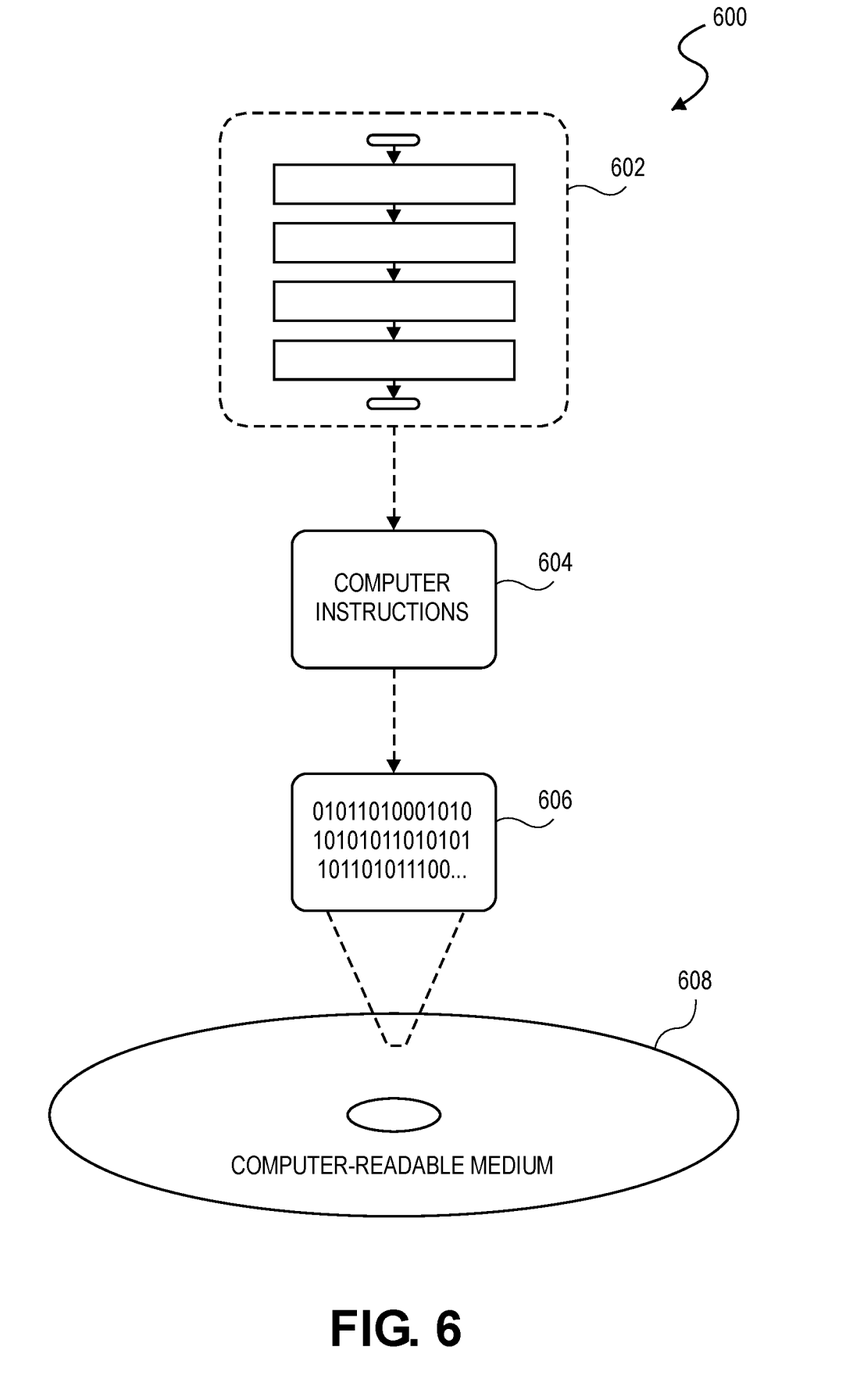
FIG. 6 is a block diagram illustrating an exemplary computer readable medium encoded with instructions, in accordance with embodiments of the present disclosure.

Regarding computer readable media, FIG. 6 is a block diagram illustrating an exemplary computer readable medium 600 encoded with instructions, as described in regard to processes 200, 300, 400, and 500 of FIGS. 2 through 5, respectively. More particularly, the implementation can include a computer-readable medium 608 (e.g., a CD-R, DVD-R or a platter of a hard disk drive), on which is encoded computer-readable data 606. This computer-readable data 606 in turn can include a set of computer instructions 604 configured to operate according to one or more of the principles set forth herein. In one such implementation 602, the processor-executable instructions 604 may be configured to perform a method, such as at least some of exemplary processes 200, 300, 400, and 500, for example. In another such implementation, the processor-executable instructions 604 may be configured to implement a system on a computing device, such as at least some of the exemplary, executable components of computing device 700 of FIG. 7, as described below. Many such computer readable media may be devised, by those of ordinary skill in the art, which are configured to operate in accordance with the implementations presented herein.

Figure 7:
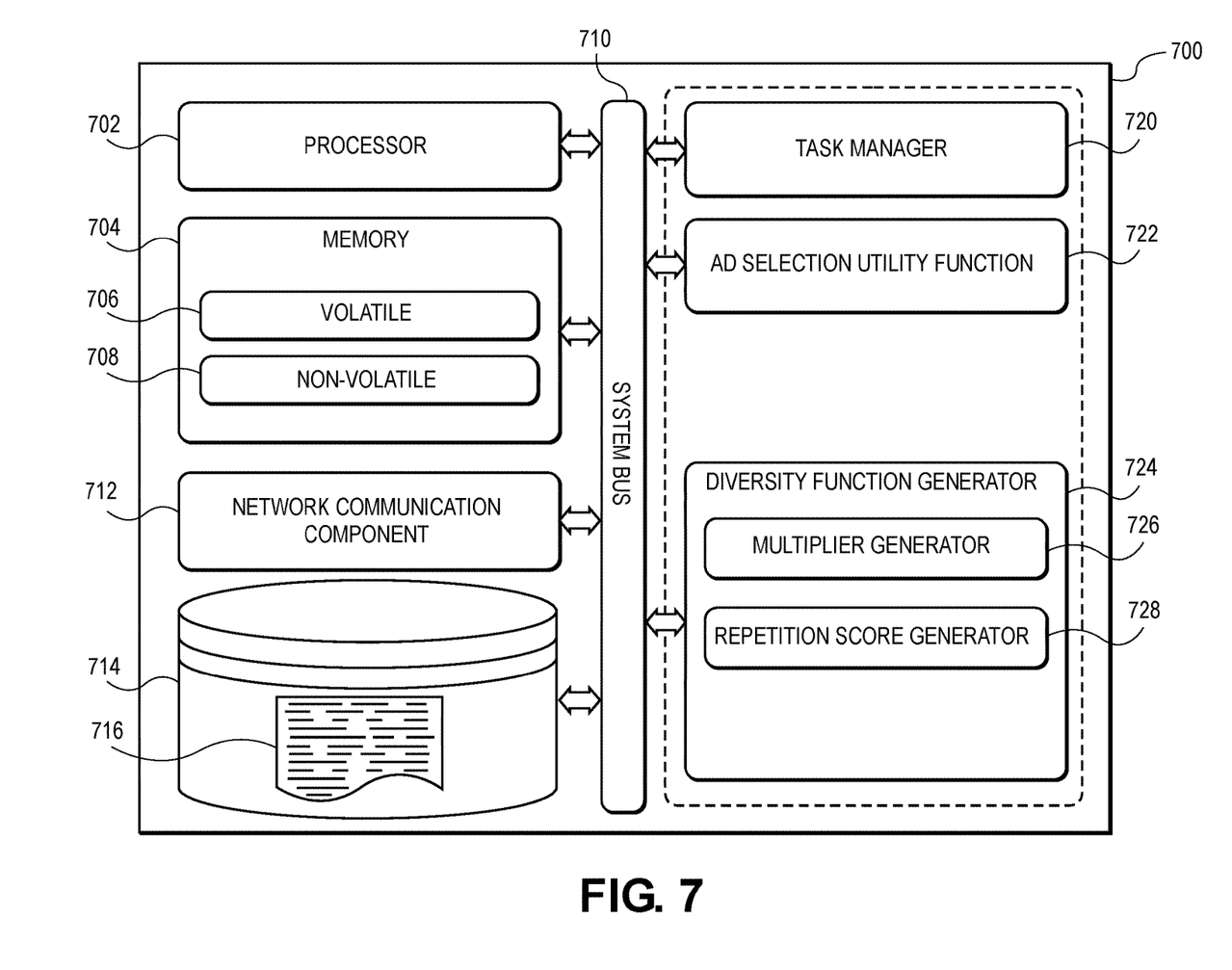
FIG. 7 is a block diagram illustrating an exemplary computing system (or computing device) configured for implementing embodiments of the present disclosure.

Turning now to FIG. 7, FIG. 7 is a block diagram illustrating an exemplary computing system 700 (or computing device) suitably configured for implementing the described implementations. Computing system 700 typically can include one or more processors (or processing units), such as processor 702, and further includes at least one memory 704. The processor 702 and memory 704, as well as other components of the computing system, are interconnected by way of a system bus 710.

As will be appreciated by those skilled in the art, the memory 704 typically (but not always) includes both volatile memory 706 and non-volatile memory 708. Volatile memory 706 retains or stores information so long as the memory is supplied with power. In contrast, non-volatile memory 708 is capable of storing (or persisting) information even when a power supply is not available. Generally speaking, RAM and CPU cache memory are examples of volatile memory 706 whereas ROM, solid-state memory devices, memory storage devices, and/or memory cards are examples of non-volatile memory 708.

As will be further appreciated by those skilled in the art, the processor 702 executes instructions retrieved from the memory 704, from computer readable media, such as computer readable media 608 of FIG. 6, and/or other executable components in carrying out the various described implementations. The processor 702 may be comprised of any of a number of available processors such as single-processor, multi-processor, single-core units, and multi-core units, which are well known in the art.

Further still, the illustrated computing system 700 typically also includes a network communication interface 712 for interconnecting this computing system with other devices, computers and/or services over a computer network, such as network 108 of FIG. 1. The network communication interface 712, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 712, is typically comprised of hardware and/or firmware components (and may also include or comprise executable software components) that transmit and receive digital and/or analog signals over a transmission medium (i.e., the network).

The exemplary computing system 700 further includes an executable task manager 720. As described, task manager 720 can include advertisement selection utility function 722 and diversity function generator 724. Diversity function generator 724 can include multiplier generator 726 and repetition score generator 728. Task manager 720 may be operable to deliver content to devices, receive information from devices, and/or perform one or more of the routines 200, 300, 400, and/or 500. In some implementations, the content system may provide advertisements 716 from a digital content items store 714 for presentation on a user device. As discussed above, the content system may also determine which potential advertisements to provide for presentation to a user on a user device.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 2-5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer implemented method, comprising:
   receiving, from a client device, a request for an advertisement for presentation on the client device;
   determining a diversity penalty for each of a plurality of prospective advertisements for presentation on the client device, wherein determining each diversity penalty includes, at least:
      determining a first entropy associated with a hypothetical benchmark advertisement, the first entropy being a function of previous advertisements presented on the client device;
      determining a second entropy associated with a respective prospective advertisement of the plurality of prospective advertisements, the second entropy being a function of previous advertisements presented on the client device;
      determining a delta entropy based at least in part on a comparison of the first entropy and the second entropy; and
      determining the diversity penalty based at least in part on the delta entropy and a multiplier;
   determining a rank order of at least a portion of the plurality of prospective advertisements based at least in part on the diversity penalty for each of the plurality of prospective advertisements; and
   providing at least one of the plurality of prospective advertisements for presentation on the client device based at least in part on the rank order.

2. The computer implemented method of claim 1, wherein the diversity penalty is based at least in part on a number of times the respective prospective advertisement was presented to a user of the client device.

3. The computer implemented method of claim 1, wherein the multiplier includes one of a delta entropy multiplier or a normalizing delta entropy multiplier.

4. The computer implemented method of claim 1, wherein the first entropy and the second entropy include a Shannon index.

5. The computer implemented method of claim 1, wherein the first entropy and the second entropy are each based at least in part on a number of advertisements associated with an advertiser that were previously presented to a user of the client device over a lookback period.

6. The computer implemented method of claim 5, wherein the advertisements presented to the user of the client device over the lookback period are assigned weights based on a time decay function.

7. The computer implemented method of claim 1, wherein the hypothetical benchmark advertisement includes a hypothetical advertisement that has never been presented to a user of the client device.

8. A computer-readable medium having computer-executable instructions stored thereon, which, when executed by a processor of a computing system, cause the computing system to at least:
- receive, from a client device, a request for an advertisement for presentation on the client device;
- determine a diversity penalty for each of a plurality of prospective advertisements for presentation on the client device, wherein determination of each diversity penalty includes, at least:
  - determining a first diversity index corresponding to a first entropy associated with a hypothetical benchmark advertisement, the first entropy being based on previous advertisements presented on the client device;
  - determining a second diversity index corresponding to a second entropy associated with a respective prospective advertisement of the plurality of prospective advertisements, the second entropy being based on previous advertisements presented on the client device;
  - determining a delta entropy based at least in part on a comparison of the first entropy and the second entropy; and
  - determining the diversity penalty based at least in part on the delta entropy and a multiplier, wherein the multiplier is a function of a number of advertisement impressions presented on the client device;
- determine a rank order of at least a portion of the plurality of prospective advertisements based at least in part on the diversity penalty for each of the plurality of prospective advertisements; and
- provide at least one of the plurality of prospective advertisements for presentation on the client device based at least in part on the rank order.

9. The computer-readable medium of claim 8, wherein the computer-executable instructions further include instructions that, when executed by the processor, cause the computing system to at least: determine a respective advertiser for each of the prospective advertisements, wherein the second diversity index is based at least in part on a number of advertisements associated with the respective advertiser that have been sent for presentation on the client device over a lookback period.

10. The computer-readable medium of claim 8, wherein the first diversity index and the second diversity index include a Shannon index.

11. The computer-readable medium of claim 8, wherein a lowest value for the diversity penalty is zero.

12. The computer-readable medium of claim 8, wherein the computer-executable instructions further include instructions that, when executed by the processor, cause the computing system to at least: determine a utility function to apply to the plurality of prospective advertisements; and determine the rank order based on the utility function and the diversity penalty.

13. The computer-readable medium of claim 12, wherein the utility function includes a relevance factor and a bid factor.

14. The computer-readable medium of claim 12, wherein the utility function includes a trimmer to eliminate at least one of the prospective advertisements from the plurality of advertisements prior to determining a diversity penalty for each of the plurality of prospective advertisements, wherein the trimmer eliminates the at least one of the prospective advertisements based on a ranking of the plurality of prospective advertisements determined by the utility function.

15. The computer-readable medium of claim 8, wherein the computer-executable instructions further include instructions that, when executed by the processor, cause the computing system to at least: determine that a number of advertisements presented to a user of the client device over a lookback period exceeds a threshold; and determine a normalizing factor to apply to the multiplier.

16. The computer-readable medium of claim 8, wherein the computer-executable instructions further include instructions that, when executed by the processor, cause the computing system to at least: determine that a number of advertisements presented to a user of the client device over a lookback period is below a threshold; and determine a delta entropy multiplier to apply as the multiplier.

17. A computing system, comprising:
- one or more processors; and
- a memory storing program instructions that when executed by the one or more processors cause the one or more processors to at least:
- receive, from a client device, a request for an advertisement to be presented on the client device;
- for each of a plurality of prospective advertisements:
  - determine a first entropy associated with a hypothetical benchmark advertisement;
  - determine a second entropy associated with a respective prospective advertisement of the plurality of advertisements;
  - determine a delta entropy based on a comparison of the first entropy and the second entropy;
  - determine a multiplier for the respective prospective advertisement;
  - determine a diversity penalty based at least in part on the multiplier and the delta entropy; and
  - combine the diversity penalty with a utility function;
- determine a rank order of at least a portion of the plurality of prospective advertisements based at least in part on the combined diversity penalty and the utility function; and
- provide at least one of the plurality of prospective advertisements for presentation on the client device based at least in part on the rank order.

18. The computing system of claim 17, wherein the multiplier is based at least in part on a number of advertisements presented to a user of the client device during a lookback period.

* * * * *